United States Patent
Van Schaftingen et al.

(10) Patent No.: US 6,814,921 B1
(45) Date of Patent: Nov. 9, 2004

(54) METHOD FOR MAKING A FUEL TANK IN PLASTIC MATERIAL

(75) Inventors: Jules-Joseph Van Schaftingen, Wavre (BE); Yannick Gerard, Kraainem (BE); Serge Dupont, Vilvoorde (BE); Stephane Leonard, Brussels (BE)

(73) Assignee: Solvay (Societe Anonyme), Brussels (BE)

( * ) Notice: Subject to any disclaimer, the term of this patent is extended or adjusted under 35 U.S.C. 154(b) by 175 days.

(21) Appl. No.: 10/203,962

(22) PCT Filed: Feb. 16, 2001

(86) PCT No.: PCT/EP01/01804

§ 371 (c)(1),
(2), (4) Date: Nov. 14, 2002

(87) PCT Pub. No.: WO01/60592

PCT Pub. Date: Aug. 23, 2001

(30) Foreign Application Priority Data

Feb. 18, 2000 (BE) .......................................... 2000/0130

(51) Int. Cl.⁷ ................................................ B29C 49/20
(52) U.S. Cl. ........................ 264/513; 264/516; 264/152; 264/161
(58) Field of Search .................................. 264/513, 516, 264/152, 161

(56) References Cited

U.S. PATENT DOCUMENTS

| 3,767,740 A | 10/1973 | Jones-Hinton et al. |
| 5,106,569 A | * 4/1992 | Rathman et al. ............ 264/529 |
| 5,129,544 A | 7/1992 | Jacobson et al. |
| 2001/0015513 A1 | 8/2001 | Schaftingen et al. |

FOREIGN PATENT DOCUMENTS

| DE | 1 801 966 | 6/1970 |
| EP | 1 110 697 A2 | 6/2001 |
| FR | 1541652 | 10/1968 |
| JP | 05229015 | 9/1993 |
| JP | 11254511 | 9/1999 |

* cited by examiner

Primary Examiner—Suzanne E. McDowell
(74) Attorney, Agent, or Firm—Stites & Harbison PLLC; Ross F. Hunt, Jr.

(57) ABSTRACT

Process for manufacturing a plastic fuel tank from two shells formed by molding, which are joined together, at least one shell being produced by compression-molding a portion of a plastic sheet between a mold and a punch and by the remaining portion of the sheet being blow-molded in the region not compression-molded.

10 Claims, 1 Drawing Sheet

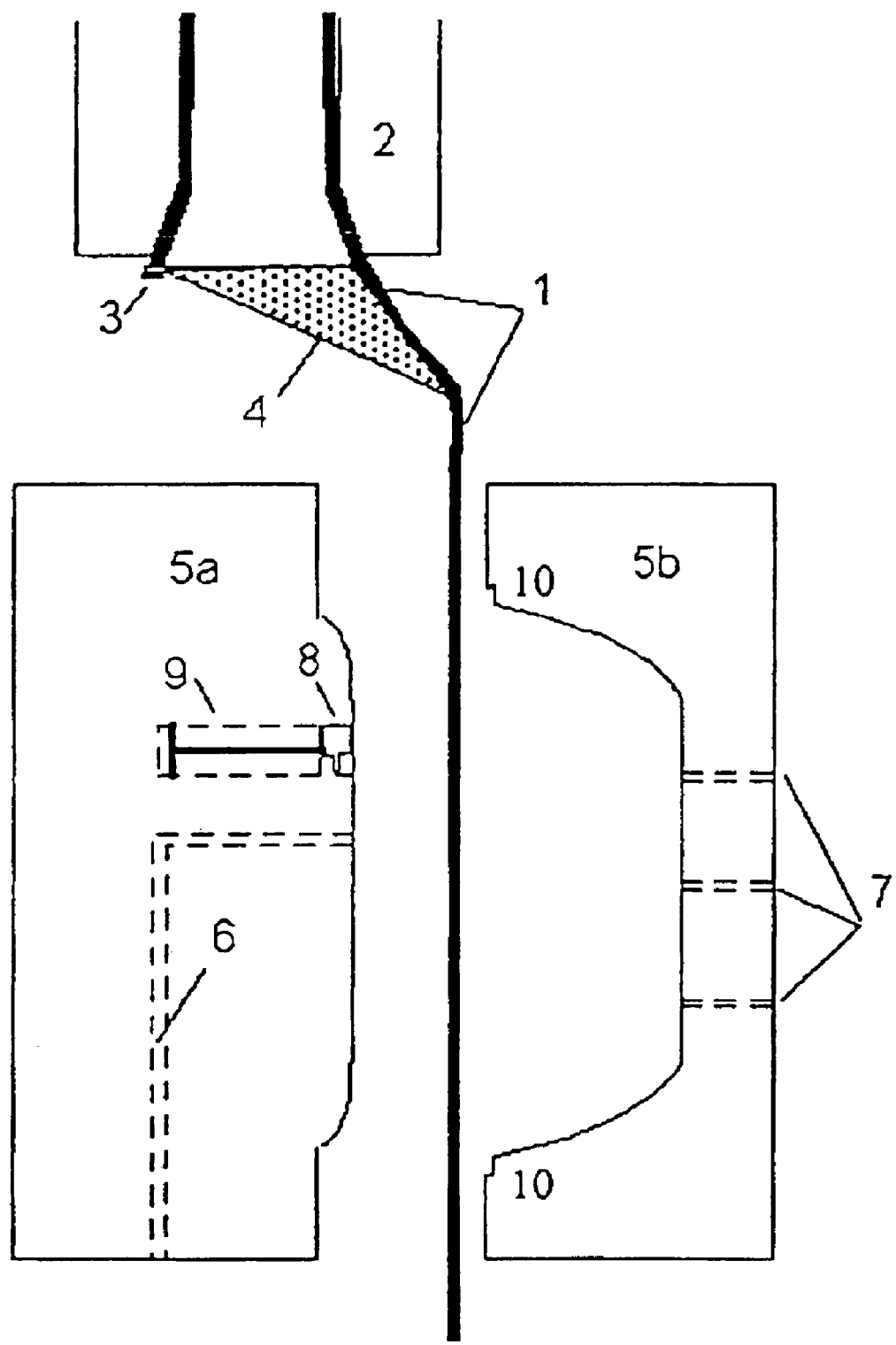

METHOD FOR MAKING A FUEL TANK IN PLASTIC MATERIAL

The present invention relates to a process for manufacturing a plastic fuel tank.

Plastic fuel tanks on board vehicles of various kinds must generally meet sealing and permeability standards in relation to the type of usage for which they are designed and the environmental requirements that they must respect. At the present time, both in Europe and in the world, there is a substantial tightening of the requirements relating to the limitation of pollutant emissions into the atmosphere and the environment in general. As a consequence, the design of fuel tanks is moving rapidly toward techniques capable of providing a better guarantee of sealing and of safety under various operating conditions. Moreover, manufacturers are also striving to reduce as far as possible the losses caused by various pipes and accessories connected to the tanks. One means sometimes used has been to incorporate certain accessories and pipes inside the tanks, thus eliminating their interface with the external environment.

Patent application GB-1 136 613 discloses a process for molding articles from a sheet of thermoplastic resin, comprising the extrusion of the sheet followed by its molding in a two-part mold, the peripheral outlines of which can press the peripheral parts of the sheet, producing a join capable of maintaining a pressure difference on either side of the sheet so as to form the central part.

This known process is, however, applied to the manufacture of open articles having around their periphery a flat edge, which is optionally recessed by a groove. The articles, of quite small size, are suitable as containers. They are manufactured with blowing pressures of at most 10 kg/cm2. In addition, no device or accessory is introduced before molding or found in the articles obtained.

Patent U.S. Pat. No. 5,129,544 is known, which discloses a plastic fuel tank comprising two hollow shells made of a multilayer material, said shells being joined together in an impervious manner over their entire perimeter by fastening together their flat peripheral rim. In this tank, the shells may be formed by stamping or by vacuum-forming.

German patent application DE-OS-1 801 966 discloses the manufacture of hollow bodies made of thermoplastic from two shells which are formed by molding and joined together by mirror welding. The molding of each of the shells is performed by compression-molding a portion of a thermoplastic sheet and by blow-molding the remaining portion of the sheet in the region not compression molded.

The aim of the invention is to provide a process for producing a plastic fuel tank with excellent control of the reproducibility and accuracy of the dimensions, which may have a large volume of up to about 100 to 150 liters and which is well suited to the incorporation of accessories before the molding phase.

For this purpose, the subject of the invention is a process for manufacturing a plastic fuel tank from two shells formed by molding, which are joined together, at least one shell being produced by compression-molding a portion of a plastic sheet between a mold and a punch and by the remaining portion of the sheet being blow-molded in the region not compression-molded.

The term "fuel tank" is understood to denote a sealed tank capable of storing fuel under diverse and varied operating and environmental conditions. An example of this tank is that with which automobiles are equipped.

The fuel tank produced in the process according to the invention is made of plastic, that is to say of material comprising at least one polymer in the form of a synthetic resin.

All types of plastic may be suitable. Plastics which are very suitable belong to the thermoplastics category.

The term "thermoplastic" denotes any thermoplastic polymer, including thermoplastic elastomers, and blends thereof. The term "polymer" denotes both homopolymers and copolymers (especially binary or ternary copolymers). Examples of such copolymers are, in a non-limiting manner: random copolymers, alternating copolymers, block copolymers and graft copolymers.

Any type of thermoplastic polymer or copolymer whose melting point is below the decomposition temperature is suitable. Synthetic thermoplastics which have a melting range spread over at least 10 degrees Celsius are particularly suitable. Examples of such materials include those which exhibit polydispersity in their molecular weight.

In particular, polyolefins, thermoplastic polyesters, polyketones, polyamides and copolymers thereof may be used. A blend of polymers or copolymers may also be used, as may a blend of polymeric materials with inorganic, organic and/or natural fillers such as, for example, but non-limitingly, carbon, salts and other inorganic derivatives, natural or polymeric fibers. It is also possible to use multilayer structures consisting of stacked layers bonded together, comprising at least one of the polymers or copolymers described above.

A polymer often employed is polyethylene. Excellent results have been obtained with high-density polyethylene (HDPE).

According to the invention, the tank is manufactured from two shells. The term "shell" denotes a non-closed partial envelope in the form of an open hollow body, with a surface shape having at least one concave portion.

The two shells are joined together in order to obtain the tank. Any type of impervious joint is suitable. However, it is preferred to join the shells together by welding.

Each shell used has been formed by molding a plastic sheet. A sheet intended for molding may consist of a single plastic composition. It may also be in the form of a structure resulting from stacking several layers of different plastic compositions. A layer often used to advantage in such a structure is a layer comprising at least one material acting as a barrier to liquids and gases, in particular to hydrocarbons.

According to the invention, the molding of at least one shell comprises the compression-molding of a portion of the sheet and the blow-molding of the portion not compression-molded. These two operations are performed in the same mold.

The compression-molding is carried out by bringing together and clamping, on each side of the sheet, at least one region of a mold portion and of a punch which is fastened to the other mold portion.

The blow-molding is carried out by introducing, on one side of the sheet, into the region not compression-molded, a pressurized fluid. This fluid may be a gas, a liquid or a dispersion of at least one liquid in a gas. When the fluid comprises a liquid, it advantageously ensures better heat transfer between the sheet and the fluid. Preferably, the pressurized fluid is introduced on that side of the sheet where the punch is located. As pressurized fluid, compressed air has given good results. It is also possible to use a pressurized purging fluid containing a reactive gas. Such a reactive gas may be fluorine. It is also possible to use an inert gas, such as nitrogen. A mixture of various gases may also be used, in particular a mixture containing at least two of the above-mentioned gases. Among liquids, it may be advantageous to use water. A fluid that has led particularly to excellent results is a dispersion (a spray) of water in compressed air.

In the process according to the invention, the molding is well suited to the treatment of a sheet placed vertically. One example is that of a sheet produced by extrusion, in an extruder placed vertically, the extrusion head which includes the die being located at the lowest point and the sheet produced flowing rectilinearly owing to the effect of its own weight.

According to the invention, the sheet is obtained in the same manufacturing line as the shell which will be produced from this sheet, by cutting and opening an extruded parison of closed cross section. One of the shells may have been independently manufactured beforehand in a manufacturing unit other than for the tank. For example, the shell may have been manufactured in a molding installation different from that used to manufacture the tank.

However, at least one of the shells used is preferably molded in the same manufacturing unit as the tank. This shell may, for example, be molded in an operating phase immediately preceding the production of the tank. It may also be produced in an operating phase which is, at least partly, simultaneous with producing the tank. Both shells may also be molded in the same manufacturing unit as the tank.

In accordance with the process according to the invention, the sheet is advantageously obtained by cutting and opening a parison of closed cross section leaving the die mounted on the extrusion head. The cutting operation consists in piercing and cutting, through its entire thickness, the wall of the parison along a curve of predetermined shape and length. Preferably, the cutting curve is rectilinear. Also preferably, the cutting is carried out continuously over the entire length of the parison. Most preferably, the cut is produced as a straight line over the entire length of the parison.

The cut parison may be opened by any suitable means. In particular, the cut parison may be opened by means of guiding devices. Examples of such devices are, in a non-limiting manner, wheels and rollers.

According to one particularly preferred method of implementing the process according to the invention, that portion of the sheet which undergoes compression-molding comprises the regions for joining the shells together.

The "joining regions" are understood to mean those portions of the shell which are intended to co-operate with that portion of the other shell during joining so as to produce a sealed tank.

When the two shells are joined together by welding, the joining regions comprise the weld edges.

One particular method of implementing the process according to the invention consists in compression-molding and blow-molding the two shells at the same time, by using stacked double molds, also called sandwich molds or stack molds.

According to another particularly advantageous method of implementing the process according to the invention, before joining, at least one accessory of the fuel tank is inserted into the shell and fixed onto it.

The term "accessory" is understood to denote any object or device generally associated with the fuel tank in its usual method of use or of operation and which co-operates with the fuel tank to provide certain useful functions. Non-limiting examples of such accessories are liquid pumps, delivery tubes, reservoirs or baffles internal to the fuel tank, venting devices.

Any method of fixing the accessory to the shell which is compatible with the use of the fuel tank is suitable. One fixing method which has given good results is welding.

Alternatively, the accessory may, while the shell is being molded, be molded at the same time as the latter, with the intervention of at least one particular device.

One useful technique for effecting this simultaneous molding of the accessory and of the shell is for the sheet serving for manufacturing the shell to undergo flow, at the very least in a localized region of this sheet.

Another method of fixing the accessory in the process according to the invention comprises the use of an additional device for overmolding the shell, which allows at least one accessory of the fuel tank to be molded and fixed directly by the addition of material on one side of the wall of the shell. The preferred material is a plastic or a plastic-based composite. A plastic identical to that of the sheet has given good results.

The overmolding may, in this way, be carried out on the inside (concave side) of the shell. It may also be carried out on the outside (convex side). Preferably, this technique is used to mold and fix an accessory on the inside (concave side) of the shell, because of the incorporation, after the shells have been molded, of the accessory thus produced inside the tank.

According to this latter particular technique, the addition of material may be performed by injection-molding a plastic composition.

It is also possible to combine the fixing of at least one accessory by flow of the sheet, as described above, with that of at least one additional accessory by overmolding on the inside.

Another method for fixing an accessory to the inside of the shell comprises the use of at least one device placed on the punch side or on the die side of the mold, which is capable of fixing at least one fuel tank accessory by welding the latter to the sheet. An alternative fixing technique consists in at least partially covering the accessory with a portion of the sheet. Preferably, at least two devices are used.

The die side is that which corresponds in the mold to the outside of the shell and of the tank. Preferably, two devices placed on the punch side are used, so as to fix an accessory to the shell and to the tank on the inside.

This latter method of fixing an accessory may also be combined with one or more other methods described above.

In one particular beneficial method of implementing the process according to the invention, a pre-assembled structure is inserted during molding, allowing the tank to be stiffened by simultaneously pressing on each of the two shells and/or fixing at least one accessory of the tank.

The preassembled structure is made of a material composition or material compatible with the tank. Preferably, it comprises a plastic of the same nature as that of the internal wall of the tank. The preassembled structure may combine several identical or different accessories via any suitable fastening means. Examples of these means are snap-fastening, clamping by screwing, welding, etc. It is also advantageous for the preassembled structure to bear means which make it possible to combine further accessories which, optionally, would be fixed later. These means are also snap-fastening devices, tapped holes or threaded protuberances of circular shape allowing screwing, surface regions suitable for welding, etc.

The insertion of a preassembled structure may be combined with one or more methods of fixing accessories already described above.

It is particularly advantageous for the preassembled structure also itself to bear at least one fuel tank accessory.

After the operation of joining the two shells together, the tank may undergo any type of surface treatment. One example of treatment is that which consists in fluorinating the tank. It is thus possible to treat the internal surface of the tank or its external surface, or else to treat both surfaces simultaneously. After the molding operation, the shell advantageously undergoes deflashing of material, for example of weld beads, in the regions which have been compression-molded. This operation is generally performed with a profiled knife matched to the external dimensions of the tank.

According to the invention, it is beneficial, so as to improve the accuracy of the dimensions of the shells, to then apply a shaping template around the shells and to leave it in contact with at least one portion of the regions of these shells for the time needed for the latter to cool. This technique is particularly beneficial when the template is in contact with the joining regions of the shells.

The figure below is given for the purpose of illustrating one specific method of implementing the invention, without wishing in any way to restrict its scope. It represents an extrusion-blow-molding installation with continuous extrusion used to produce automobile gas tanks. The multilayer extrudate (1) comprises 5 layers, namely HDPE/adhesive/barrier/adhesive/HDPE. The adhesive is maleic anhydride-grafted polyethylene. The tubular extrudate (1) leaving the circular die, which is mounted on the extrusion head (2), is cut along a generatrix using a steel blade (3) placed at the exit of the circular die.

After the extruate (1) has been cut, it is bent back to form a sheet (1) which is guided by means of a system of inclined surfaces (4). The mold (5) then comes into an open position beneath the extrusion head (2). The mold (5) is then closed around the sheet (1) causing it to be compression-molded in a region located between the punch (5a) and the die (5b); in line with the joint between the shells (10). The sheet (1) is then pressed against the surface of the die (5b) owing to it being impelled by the air on the die side being evacuated through venting lines (7) and pressurized air being inlet on the punch side via a blowing line (6).

A delivery tube (8) mounted on an actuator (9) has also been pressed against the inside of the sheet (1), while it was still in the melt state, being directly welded to this internal wall.

What is claimed is:

1. A process for manufacturing plastic hollow bodies from two shells formed by molding, which are joined together, at least one shell being produced by compression-molding a portion of a plastic sheet between a mold and a punch and by the remaining portion of the sheet being blow-molded in the region not compression-molded, characterized in that it is applied to the manufacture of a fuel tank and in the sheet is obtained in the same manufacturing line as the shell which will be produced from this sheet, by the cutting and opening an extruded parison of closed cross section.

2. The process is claimed in claim 1, characterized in that that portion of the sheet which undergoes compression-molding comprises the regions for joining the shells together.

3. The process as claimed in claim 1, characterized in that the two shells are compression-molded and blow-molded at the same time, by using stacked double molds (sandwich molds or stack molds).

4. The process as claimed in claim 1, characterized in that, before joining, at least one accessory of the fuel tank is inserted into the shell and fixed onto it.

5. The process as claimed in claim 4, characterized in that, during the operation of molding the shell, at least one particular device allows the simultaneous molding onto the shell of at least one fuel tank accessory by flow of the sheet.

6. The process as claimed in claim 4, characterized in that at least one additional device for overmolding the shell allows at least one accessory of the fuel tank to be molded and fixed directly by the addition of material on one side of the wall of the shell.

7. The process as claimed in claim 1, characterized in that the addition of material is performed by the injection-molding a plastic composition.

8. The process as claimed in claim 4, characterized in that at least one device placed on the punch side or on the die side of the mold makes it possible to fix, during molding, at least one fuel tank accessory by depositing and welding the accessory to the sheet or by partially covering the accessory with a portion of the sheet.

9. The process as claimed in claim 1, characterized in that a preassmbled structure is inserted during molding, allowing the tank to be stiffened by simultaneously pressing on each of the two shells and/or fixing at least one accessory of the tank.

10. The process as claimed in claim 2, characterized in that, after shell has been molded, the weld beads are deflashed and then a shaping template is applied, which is left in contact with a least one portion of the regions of the shells for the time need to cool the latter and to improve the accuracy of the dimensions of the shells.

* * * * *